United States Patent
Cavil et al.

[15] 3,662,243
[45] May 9, 1972

[54] ELECTRICAL CIRCUIT FOR STEERING AND THROTTLE CONTROL OF A MARINE PROPULSION DEVICE

[72] Inventors: David T. Cavil, Menomonee Falls; William R. Krueger, Milwaukee; Henry J. Schmidt, Menomonee Falls, all of Wis.

[73] Assignee: Outboard Marine Corporation, Waukegan, Ill.

[22] Filed: Nov. 16, 1970

[21] Appl. No.: 89,792

[52] U.S. Cl. ................................318/588, 318/467, 318/674
[51] Int. Cl. .........................................G05d 1/08, B63h 25/02
[58] Field of Search ..............................318/588, 674, 467

[56] References Cited

UNITED STATES PATENTS

| | | | |
|---|---|---|---|
| 3,068,388 | 12/1962 | Burski | 318/674 |
| R23,010 | 6/1948 | Howard | 318/674 X |
| 2,718,145 | 9/1955 | Nisle | 318/674 X |
| 2,914,717 | 11/1959 | Redding | 318/674 X |
| 2,922,930 | 1/1960 | Schaeve | 318/674 X |
| 3,505,577 | 4/1970 | Hirokawa | 318/588 |

Primary Examiner—Benjamin Dobeck
Attorney—Robert E. Clemency, John W. Michael, Gerrit D. Foster, Bayard H. Michael, Paul R. Puerner, Joseph A. Gemignani, Andrew O. Riteris and Spencer B. Michael

[57] ABSTRACT

Disclosed herein is a steering control for the steerable unit of a marine propulsion device, such as a stern drive unit, which control includes a first potentiometer connected to a source of electrical current and having a first wiper connected to a steering wheel to afford variation in the potential at the first wiper in accordance with the steering wheel setting, together with a second potentiometer connected to the current source and including a second wiper connected to the steering unit to afford variation in the potential of the second wiper in accordance with the position of the steering unit, and transistorized switch means connected to the current source and to the wipers and selectively operable for causing movement of the steering unit in response to movement of the steering wheel.

9 Claims, 2 Drawing Figures

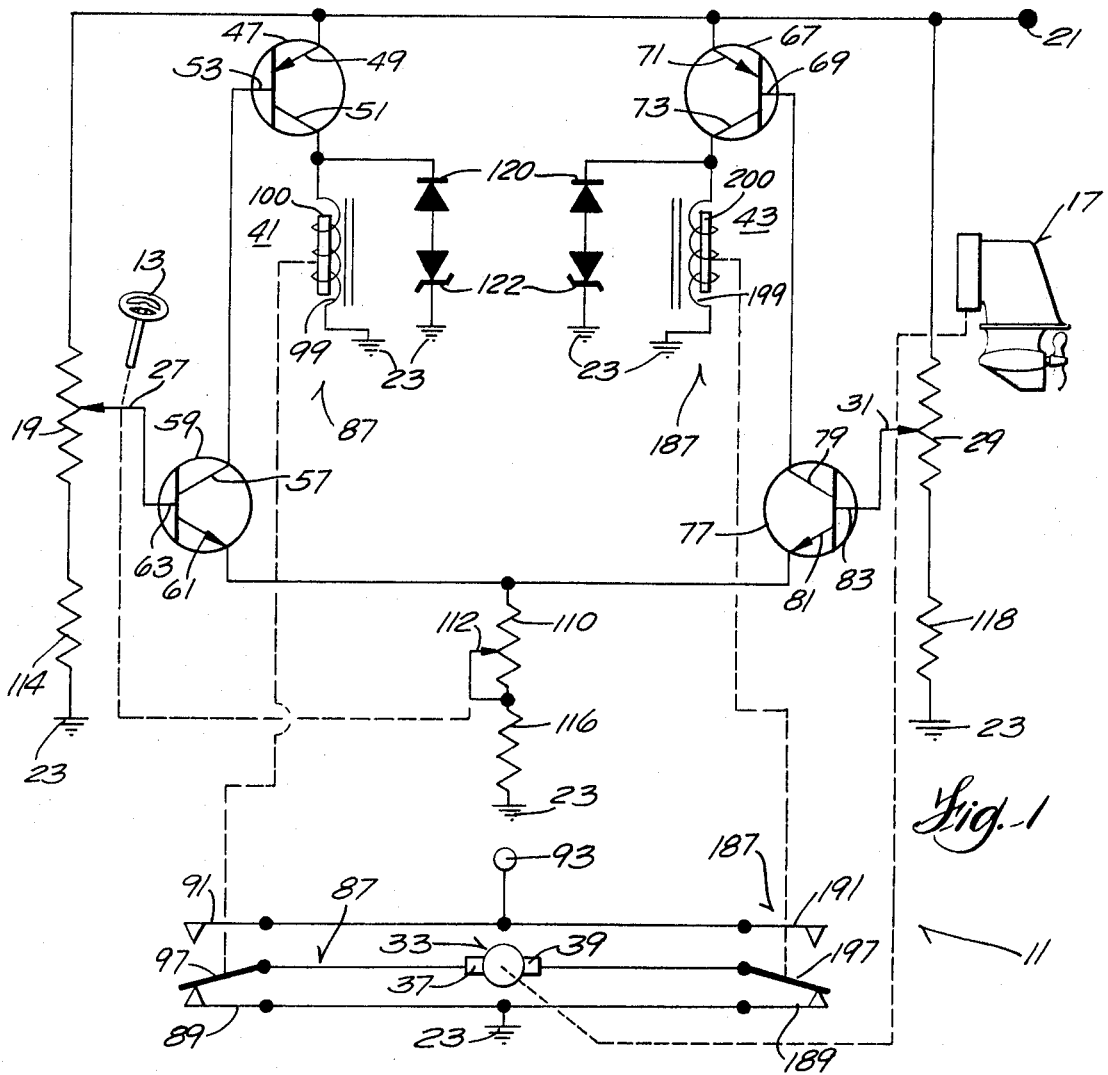
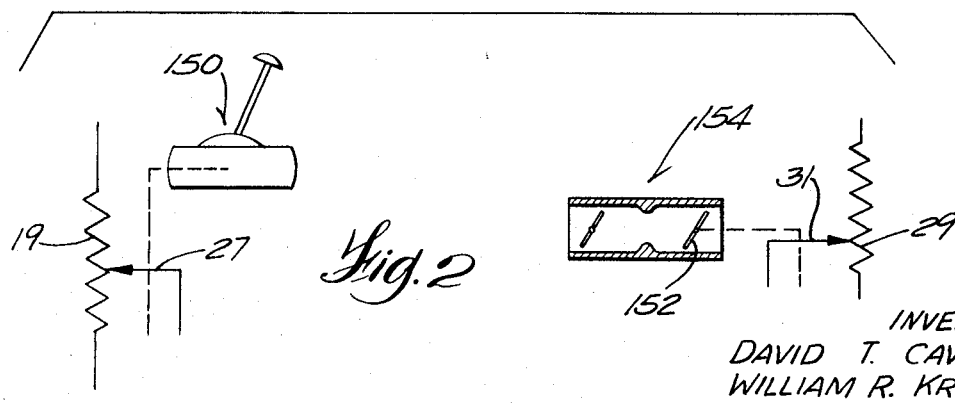
Fig. 1
Fig. 2
INVENTORS
DAVID T. CAVIL
WILLIAM R. KRUEGER
HENRY J. SCHMIDT
BY Robert E. Clemency
ATTORNEY

ELECTRICAL CIRCUIT FOR STEERING AND THROTTLE CONTROL OF A MARINE PROPULSION DEVICE

RELATED APPLICATION

Attention is hereby called to the co-pending Cavil application Ser. No. 89,605 filed Nov. 16, 1970

BACKGROUND OF THE INVENTION

In the past, steering control of the steerable leg of a marine propulsion unit, such as a stern drive unit, has generally been accomplished through a remote steering wheel which was connected to the steering leg through a manually operated push-pull or other cable linkage or through a hydraulically operated system. The manually operated systems are becoming more undesirable due to the use of increased horsepower while the hydraulically operated steering systems suffer from the disadvantages of high cost with respect to initial installation as well as repair, and of substantial possibility of operating failure due to loss of hydraulic fluid.

SUMMARY OF THE INVENTION

The invention provides an electrical steering system with feed-back control for the steering unit of a marine propulsion device, such as a stern drive unit or outboard motor.

In accordance with the invention, there is provided an electrical circuit including a first potentiometer adapted to be connected to a source of electrical current and having a first wiper which is connected to a remote steering wheel to afford variation in the potential at the first wiper in accordance with steering wheel actuation, together with a second potentiometer adapted to be connected to the source of electrical energy and including a second wiper connected to the swingable steering unit to afford variation in the potential of the second wiper in accordance with the position of the swingable steering unit, and means adapted to be connected to the source of electrical current and to the wipers and selectively operable for causing swinging of the steering unit in response to movement of the steering wheel.

In further accordance with the invention, the steering unit swinging means is selectively operable for causing swinging of the steering unit in one direction when the first potentiometer or steering wheel wiper is at a greater potential than the second potentiometer or steering unit wiper, and for causing swinging of the steering unit in the other direction when the second potentiometer or steering unit wiper is at a greater potential than the first potentiometer or steering wheel wiper.

Still more particularly, the selectively operable means for causing swinging of the steering unit includes means which can be a direct current reversible electric motor for selectively swinging the steering unit in opposite directions, together with first and second transistorized switch means which are respectively adapted to be connected to the source of current and to the first and second potentiometer wipers and to the steering unit swinging means for effecting swinging movement of the steering unit in one direction when the potential at the first potentiometer wiper is greater than the potential at the second potentiometer wiper and for effecting swinging of the steering unit in the opposite pivotal direction when the potential at the second potentiometer wiper is greater than the potential at the first potentiometer wiper.

Still more particularly, both the first and second transistorized switch means each include first and second transistors with each first transistor having an emitter adapted to be connected to the current source, a collector connected to the steering unit swinging means to afford selective swinging movement of the steering unit in opposite directions (depending upon current flow from the collectors). In addition, each of the first transistors includes a base which is connected to the collector of the respectively associated second transistor which also includes an emitter connected to ground and a base, one of which base is connected to the first position sensing potentiometer wiper and the other of which bases is connected to the second position sensing potentiometer wiper.

The selectively operable means further includes relay operated switch means connected to the collectors of the first transistors to control energizing of the reversible electric motor to cause swinging movement of the steering unit to thereby cause the steering unit to follow the movements of the steering wheel and to thereby also cause the steering unit potentiometer to be located at substantially the same potential as the steering wheel potentiometer.

Further in accordance with the invention, the emitters of the second transistors are connected to ground through a common tracking resistor or potentiometer having a wiper mechanically connected or coupled to one of the steering wheel or steering unit wipers to inversely effect the setting of the common potentiometer wiper in accordance with the setting of the one wiper.

The principal object of the invention is the provision of a feed-back control system which is applicable to control the throttle or steering movements of a marine propulsion device or to control the output of some other apparatus in accordance with commands from a master unit.

Another principal object of the invention is the provision of a transistorized feed-back control system in which a slave unit is connected to follow the action of a master unit.

Still another principal object of the invention is the provision of a feed-back control circuit including transistorized switch means in which switch sensitivity is maintained despite variation in the potential applied across a transistorized switch.

Still another of the principal objects of the invention is the provision of a control circuit including a first potentiometer having a wiper connected to a first input to afford variation in the potential at the first wiper in accordance with the first input, together with a second potentiometer adapted to be connected to the source of electrical current and including a second wiper connected to the second input to afford variation in the potential at the second wiper in accordance with the second input, and means adapted to be connected to the source of electrical energy and to the wipers and selectively operable to cause the second input to follow the first input and thereby to cause the second wiper to be positioned such that the potentials at the first and second wipers are substantially the same.

Another of the principal objects of the invention is the provision of an electrically controlled steering system which has the advantage, as compared to prior hydraulic systems, of being less costly to install and maintain, of being less apt to fail in service and easier to repair, and of being readily adapted to multiple station usage.

Still another object of the invention is the provision of a transistorized feed-back steering control system which is economical to construct and maintain and which will provide reliable service over a long and useful life.

Other objects and advantages of the invention will become known by reference to the following description and accompanying drawings.

DRAWINGS

FIG. 1 is a wiring diagram of a feed-back control circuit applicable to the steering unit of a marine propulsion device.

FIG. 2 is a fragmentary view illustrating application of the circuit shown in FIG. 1 for throttle control.

GENERAL DESCRIPTION

Shown in FIG. 1 of the drawings is a control circuit 11 which is applicable to afford steering control of a steerable drive unit, such as the drive leg of a marine propulsion stern drive unit or the propulsion unit of an outboard motor. In operation, the circuit 11 electrically compares the setting of a remote steering wheel 13 with the setting of the steering unit 17 and is operable to cause such movement of the steering unit 17 as is appropriate to cause the steering unit 17 to follow the steering wheel 13, i.e., to swingably pivot the steering unit 17 by suitable means to cause the steering unit 17 to move to a position corresponding to or in registry with the position of the steering wheel 13 whenever steering wheel movement by the operator causes temporary misregistration between the steering wheel 13 and the steering unit 17.

In accordance with the invention, there is provided a first variable resistor or potentiometer 19 which is connected between a source 21 of electrical energy, such as a battery, and a ground 23 and which includes a wiper 27 mechanically connected to the steering wheel 13 so that the potential at the wiper 27 varies in accordance with the angular position of the steering wheel 13.

Also in accordance with the invention, there is provided a second variable resistor or potentiometer 29 which is connected between the source 21 of electrical energy and the ground 23 and which includes a wiper 31 mechanically connected to the steering unit 17 so that the potential at the wiper 31 varies in accordance with the angular position of the steering unit 17.

Still further in accordance with the invention, there is provided means connected to the current source 21 and to the wipers 27 and 31 and selectively operable for causing swinging of the steering unit 17 in response to movement of the steering wheel 13, i.e., to cause the steering unit 17 to swing in one direction when the steering wheel wiper 27 is at a greater potential than the steering unit wiper 31 and for causing swinging of the steering unit 17 in the opposite rotative direction when the steering unit wiper 31 is at a greater potential than the steering wheel wiper 27.

While various constructions can be employed, in the construction shown in FIG. 1, the selectively operable means includes means mechanically connected to the steering unit 17 for selectively swinging the steering unit 17 in opposite directions. While various arrangements including hydraulic or other components can be employed, in the disclosed construction, the steering unit swinging means comprises a reversible electrical motor 33 which is mechanically drivingly connected to the steering unit 17 to cause steering movement of the steering unit 17 in one pivotal direction upon energizing of the motor 33 for operation in a first rotative direction and to cause steering movement of the steering unit 17 in the opposite pivotal direction upon energizing of the motor 33 in the opposite rotative direction. In this regard, the motor 33 includes a first terminal 37 which, when energized causes operation of the motor 33 in one rotative direction and a second terminal 39 which, when energized, causes operation of the motor 33 in the other rotative direction. If both terminals 37 and 39 are connected to ground 23 or if both terminals are simultaneously energized, the motor 33 will not operate in either rotative direction. Preferably, the motor 33 is of the type which can be dynamically braked when both terminals are connected together.

In the disclosed construction, the selectively operable means further includes a first transistorized switch means 41 which is connected to the source of current 21 and to the first potentiometer or steering wheel wiper 27 and to the steering unit swinging means, i.e., in the specifically disclosed construction, the reversible motor 33, for effecting swinging of the steering unit 17 in one pivotal direction when the potential at the steering wheel potentiometer wiper 27 is greater than the potential at the steering unit potentiometer wiper 31. In addition, the means selectively operable to pivot the steering unit 17 to bring the steering unit 17 into registry with the steering wheel 13 includes a second transistorized switch means 43 connected to the source 21 of current and to the steering unit potentiometer wiper 31 and to the steering unit swinging means, i.e., in the disclosed construction, the reversible electric motor 33, for effecting swinging of the steering unit 17 in the opposite rotative direction when the potential at the steering unit potentiometer wiper 31 is greater than the potential at the steering wheel potentiometer wiper 27.

Still further in accordance with the invention, the first transistorized switch means 41 includes a first transistor 47 having an emitter 49 connected to the energy source 23, and a collector 51 connected to the steering unit swinging means to cause pivotal movement in one rotative direction in response to current flow from the first transistor collector 51. In addition, the first transistor 47 includes a base 53 which is connected to a collector 57 of a second transistor 59 which also has an emitter 61 connected to ground 23 and a base 63 connected to the steering wheel potentiometer wiper 27.

The second transistorized switch means 43 is constructed generally the same as the first transistorized switch means 41 and includes a third transistor 67 having a base 69, and an emitter 71 connected to the current source 21, and a collector 73 connected to the steering unit swinging means to cause pivotal steering unit movement in the other rotative direction in response to current flow from the third transistor collector 73. In addition, the second transistorized switch means 43 includes a fourth transistor 77 having a collector 79 connected to the third transistor base 69, an emitter 81 connected to ground 23, and a base 83 connected to the steering unit potentiometer wiper 31.

The selectively operable means for causing the steering unit 17 to swing in opposite directions also includes, in the disclosed construction, a first relay switch 87 including a first contact 89 connected to the ground 23, a second contact 91 connected to a source 93 of current which can be the current source 21, and a third movable contact 97 connected to the first reversible motor terminal 37 and movable between a first position in engagement with the first contact 89 and a second position in engagement with the second contact 91. The relay switch 87 further includes a first relay coil 99 connected to the collector 51 of the first transistor 47, a first armature 100 mechanically connected to the third contact 97, and means (not shown) biasing the third contact 97 to the first position in engagement with the first contact 89 in the absence of current in the first relay coil 99.

The selectively operable means also includes a second relay switch 187 including a fourth contact 189 connected to the ground 23, a fifth contact 191 connected to the source 93 of current, and a movable sixth contact 197 connected to the second reversible motor terminal 39 and movable between a first position in engagement with the fourth contact 189 and a second position in engagement with the fifth contact 191. The second relay switch further includes a second relay coil 199 connected to the collector 73 of the third transistor 67, a second armature 200 mechanically connected to the movable sixth contact 197 and means (not shown) biasing the movable sixth contact 197 to the first position in engagement with the fourth contact 189 in the absence of current in the second relay coil 199.

Means are provided for maintaining generally uniform circuit sensitivity, notwithstanding variation in the potential at the wipers 27 and 31. In this regard, the respective emitters 61 and 81 of the second and fourth transistors 59 and 77 are connected to a common ground 23 through a common tracking resistor or potentiometer 110 of variable resistance, which resistor 110 includes a wiper 112 affording variation in the effective resistance. The tracking resistor 110 is mechanically coupled to a selected one of the wipers 27 and 31 so that the resistance to flow of the current through the selected one of the wipers 27 and 31 is the same regardless of the position of the one selected wiper. While either the steering wheel potentiometer wiper 27 or the steering unit potentiometer wiper 31 can be coupled to the tracking resistor wiper 112, in the disclosed construction, the wiper 112 of the tracking resistor 110 is mechanically coupled to the steering wheel potentiometer wiper 27 such that the tracking resistor wiper 112 moves inversely to the steering wheel potentiometer wiper 27 to decrease the effective resistance in the tracking resistor 110 when the steering wheel potentiometer wiper 27 is moved to increase the effective resistance in the steering wheel potentiometer 19. Such coupling also causes an increase in the effective resistance of the tracking resistor 110 when the steering wheel potentiometer wiper 27 is moved to decrease the effective resistance in the steering wheel potentiometer 19, i.e., moves to a more positive position near the top of the resistor 19 as shown in FIG. 1.

As shown in FIG. 1, fixed resistors 114, 116, and 118 are respectively connected between the variable resistors 19, 29, and 110 and the ground 23 to electrically trim the variable resistors 19, 29, and 110.

In order to suppress transient currents and to provide fast relay action, the relay coils 99 and 199 are each connected to the ground 23 in parallel relation with respective series connected diodes 120 and zener diodes 122 which are operative to assure that current flowing respectively from the first and third transistors 47 and 67, respectively, travels through the respective coils 99 and 199 and to permit breakdown current flow in the opposite direction.

In operation, and upon the assumption that the steering wheel 13 and the steering unit 17 are in positions of initial registry, the wipers 27 and 31 are at the same potential with respect to the ground 23. Consequently, the potential at the bases 63 and 83 of the second and fourth transistors 59 and 77, respectively, will also be about the same and the second and fourth transistors 59 and 77, respectively, will therefor conduct respectively substantially equal amounts of current through their respective base circuits and collector circuits. Such currents flow through the tracking resistor 110 and the potentials at each of the second and fourth transistor emitters 61 and 81, respectively, will stabilize at substantially the same potential which is slightly less than the wiper potentials.

In view of the conducting condition of the second and fourth transistors 59 and 77, respectively, the first and second transistors 47 and 67, respectively, will also be conducting through their respective collectors 51 and 73, respectively, to the respective relay coils 99 and 199 so as to connect both terminals 37 and 39 of the reversible motor 33 to the current source 93. Consequently, the motor terminals 37 and 39 will be shorted and the motor 33 will not operate.

However, if the steering wheel 13 is moved in the direction so as to increase the potential of the steering wheel potentiometer wiper 27, the potential at the base 63 of the second transistor 59 will be increased as will the potential at the emitter 61 of the second transistor 59, thereby affording a greater current flow. The potential at the emitter 61 of the second transistor 59 is effective at the emitter 81 of the fourth transistor 77 and is more positive than the potential at the base 83 of the fourth transistor 77 because the steering unit 17 has not as yet been moved in accordance with the movement of the steering wheel 13. As a result of the greater potential at the emitter 81 as compared to the base 83 of the fourth transistor 77, the fourth transistor 77 becomes non-conducting. Accordingly, the third transistor 67 is also shut down. As a consequence, current flows only through the relay coil 99 associated with the collector 51 of the first transistor 47 to cause the first terminal 37 of the reversible electric motor 33 to be connected to the source 93 of current and thereby to swing the steering unit 17 until the swingable unit is in register with the steering wheel and thereby to locate the steering unit potentiometer wiper 31 at essentially the same potential as the steering wheel potentiometer wiper 27. Thus, the circuit is thereby brought back to its initial condition, i.e., the fourth transistor 77 is turned on to connect both the terminals 37 and 39 of the motor 33 to the source 93 of current and thereby to shut down and brake the motor 33.

In the event that the steering wheel 13 is moved in the other direction so as to move the steering wheel potentiometer wiper 27 to a position of less potential than the steering unit potentiometer wiper 31, the circuit 11 operates in exactly the opposite manner so as to shut down the second transistor 59 and consequently the first transistor 47 and to thereby cause current flow only through the collector 73 of the third transistor 67 to the relay coil 199 so as to connect the second terminal 39 of the motor 33 to the source 93 of current and to thereby swing the steering unit 17 so as to bring it into registry with the steering wheel 13 and thereby also to simultaneously move the steering unit potentiometer wiper 31 so as to reduce its potential to approximately the potential of the steering wheel potentiometer wiper 27. As a consequence, both the first and third transistors 47 and 67, respectively, will be turned on to connect both motor terminals 37 and 39 to the source 93 of c u current, thereby braking the motor 33.

When the circuit 11 is deactivated as by disconnecting the circuit 11 from the source of current 21, the switches 87 and 187 will cause both the terminals 37 and 39 of the motor 33 to be connected to the ground 23, thereby preventing operation of the motor 33.

While the disclosed circuit 11 is particularly adapted to afford steering control, the circuit 11 can be advantageously employed in other areas, for instance, the circuit 11 can also be employed to control the throttle of an engine from a remote location. In this embodiment, as shown in FIG. 2, the wiper 27 of the first position sensing potentiometer 19 is mechanically connected to a remotely movable throttle control member or lever 150 for common movement therewith and the wiper 31 of the second position sensing potentiometer 29 is connected to the movable throttle valve 152 of a carburetor 154, or the like, for common movement therewith.

In its most basic aspect, the disclosed construction permits the generation of a selective electrical output in response to first and second mechanical inputs which respectively control the wipers of the first and second position sensing potentiometers. The output of the disclosed circuit can then be employed to drive any slave component, i.e., for instance, a stern drive leg, to a position in electrical balance with a remote controlling unit, i.e., for instance, a steering wheel. More specifically, the circuit 11 operates so that if there is an identical electrical condition at each input potentiometer (other than an absence of potential at both wipers) reflecting a common physical condition, the circuit 11 produces a first response, i.e., an equal output from each of the collectors 51 and 73. If the potentials at the wipers 27 and 31 differ from each other, the circuit 11 selectively produces two different signals depending upon whether the difference is positive or negative. If the circuit 11 is completely deactivated, a fourth output (i.e., no output) is produced.

The arrangement for employing the output from the collectors 51 and 73 of the first and third transistors 47 and 67 to cause swinging movement of the steering unit can take various configurations and can include electro-mechanical components or solid state components or any combination thereof. As also already indicated, if desired, the electrical output from the collectors 51 and 73 can also be employed to control a hydraulic system.

The disclosed construction is more advantageous than that of a conventional bridge-type error detecting circuit in that there is no polarity reversal of the error signal and in that the error signal is continuously referenced to ground rather than to the opposite bridge terminal.

In the construction shown in FIG. 1, the components can have the following values or identification:

| Component | Identification or Value |
|---|---|
| 19 | 200 ohms–5 watts |
| 29 | 200 ohms–5 watts |
| 47 | 2N3741 |
| 59 | 2N2193 |
| 67 | 2N3741 |
| 77 | 2N2193 |
| 110 | 2000 ohms–5 watts |
| 114 | 47 ohms–0.5 watts |
| 116 | 220 ohms–0.5 watts |
| 118 | 47 ohms–0.5 watts |
| 120 | 50 volts–1 amp |
| 122 | 36 volts–1 watt |
| 87 | Square D, class 8501, type K t D12 |
| 187 | Square D, class 8501, type K t D12 |

While the potentiometers 19 and 29, as well as the transistors 47 and 67 are all disclosed as being connected to the same energy source 21, separate common energy sources can be employed to energize the potentiometers 19 and 29 and for energizing the resistors 47 and 67. As already mentioned, the electric motor 33 can be energized either from the same source 21 or from a separate source 93.

Various of the features of the invention are set forth in the following claims.

What is claimed is:

1. A marine propulsion steering control including a movable steering wheel, a steerable unit swingable about a generally upright axis under normal operating conditions, a source of direct current, a first position sensing potentiometer connected to said source of direct current and having a first wiper mechanically connected to said steering wheel to afford variation in the potential at said first wiper in accordance with steering wheel setting, a second position sensing potentiometer connected to said source of direct current and including a second wiper mechanically connected to said swingable steering unit to afford variation in the potential at said second wiper in accordance with the position of said swingable steering unit, means electrically connected to said source of direct current and mechanically connected to said steering unit for selectively causing swinging of said steering unit, and transistorized switch means electrically connected to said source of direct current, to said first and second potentiometers, and to said means for causing swinging of said steering unit for selectively operating said means for causing swinging of said steering unit in response to movement of said steering wheel.

2. A steering control in accordance with claim 1 wherein said steering unit swinging means is selectively operable for causing swinging of said steering unit in one direction when said first potentiometer wiper is at a greater potential than said second potentiometer wiper and for causing swinging of said steering unit in the opposite direction when said second potentiometer wiper is at a greater potential than said first potentiometer wiper.

3. A steering control including a movable steering wheel for a marine propulsion device including a steerable unit swingable about a generally upright axis under normal operating conditions, said control comprising a source of direct current, a first position sensing potentiometer electrically connected in said source of direct current and having a first wiper mechanically connected to the steering wheel to afford variation in the potential at said first wiper in accordance with steering wheel setting, a second position sensing potentiometer electrically connected to said source of direct current and including a second wiper mechanically connected to the swingable steering unit to afford variation in the potential at said second wiper in accordance with the position of the swingable steering unit, means electrically connected to said source of direct current and mechanically connected to the steering unit for selectively swinging the steering unit is opposite directions, first transistorized switch means electrically connected to said source of direct current and to said first potentiometer wiper and to said steering unit swinging means for effecting swinging of the steering unit in one pivotal direction when the potential at said first potentiometer wiper is greater than the potential at said second potentiometer wiper, a second transistorized switch means electrically connected to said source of direct current and to said second potentiometer wiper and to said steering unit swinging means for effecting swinging of the steering unit in the opposite pivotal direction when the potential at said second potentiometer wiper is greater than the potential at said first potentiometer wiper, and a third potentiometer electrically connected to ground and to each of said first and second switch means and having a wiper mechanically connected to one of said first and second potentiometer wipers to inversely effect setting at said third potentiometer wiper in accordance with the setting of said one of said first and second potentiometer wipers.

4. A steering control including a movable steering wheel for a marine propulsion device including a steerable unit swingable about a generally upright axis under normal operating conditions, said control comprising a first position sensing potentiometer adapted to be connected to a source of electrical current and having a first wiper connected to the steering wheel to afford variation in the potential at said first wiper in accordance with steering wheel setting, a second position sensing potentiometer adapted to be connected to the source of electrical current connected to the first potentiometer and including a second wiper connected to the swingable steering unit to afford variation in the potential at said second wiper in accordance with the position of the swingable steering unit, means connected to said steering unit for selectively swinging said steering unit in opposite directions, a first transistor having an emitter adapted to be connected to a current source, a collector connected to said steering unit swinging means to cause swinging movement of said steering unit in one rotative direction in response to current flow from said first transistor collector, and a base, a second transistor having a collector connected to said first transistor base, an emitter connected to ground, and a base connected to said first potentiometer wiper, a third transistor having an emitter adapted to be connected to the current source connected to said first transistorized switch means, a collector connected to said steering unit swinging means to cause swinging movement in the other rotative direction in response to current flow from said third transistor collector, and a base, and a fourth transistor having a collector connected to said third transistor base, an emitter connected to ground, and a base connected to said second potentiometer wiper.

5. A steering control in accordance with claim 4 wherein said steering unit swinging means comprises a reversible electric motor including first and second terminals and wherein said selectively operable means further includes a first switch including a first contact connected to ground, a second contact adapted to be connected to a source of current, a movable third contact connected to said first motor terminal and movable between a first position in engagement with said first contact and a second position in engagement with said second contact, and relay means including a first coil electrically connected to said first transistor collector, a first armature mechanically connected to said third contact, and means biasing said third contact to said first position in the absence of current in said first coil, and wherein said selectively operable means further includes a second switch including a fourth contact connected to ground, a fifth contact adapted to be connected to a source of current, and a movable sixth contact connected to said second motor terminal and movable between a first position in engagement with said fourth contact and a second position in engagement with said fifth contact, and relay means including a second coil electrically connected to said third transistor collector, a second armature mechanically connected to said sixth contact, and means biasing said sixth contact to said first position in the absence of current in said second coil.

6. A steering control in accordance with claim 4 wherein said emitters of said second and fourth transistors are connected to ground through a common potentiometer having a wiper mechanically connected to one of said first and second potentiometer wipers to inversely effect setting at said common potentiometer wiper in accordance with the setting of said one of said first and second potentiometer wipers.

7. A control for selectively generating first and second outputs in response to variation between first and second inputs, said control comprising a source of direct current, a first potentiometer electrically connected to said source of direct current and having a first wiper mechanically connected to the first input to afford variation in the potential at said first wiper in accordance with the position of the first input, a second potentiometer electrically connected to said source of direct current and including a second wiper mechanically connected to the second input to afford variation in the potential at said second wiper in accordance with the position of the second input, means connected to said second input for selectively changing the position of said second input in opposite directions, a first transistorized switch means electrically connected to said source of direct current and to said first potentiometer wiper and to said second input position changing means for effecting changing of the position of said second input in one direction when the potential at said first potentiometer wiper is greater than the potential at said second potentiometer wiper, a second transistorized switch means electrically connected to said source of direct current and to said second potentiometer wiper and to said second input position changing means for effecting changing of the position of said second input in the opposite direction when the potential at said second potentiometer wiper is greater than the potential at said first potentiometer wiper, and a third potentiometer electrically connected to ground and to each of said first and second switch means and having a wiper mechanically connected to one of said first and second potentiometer wipers to inversely effect setting at said third potentiometer wiper in accordance with the setting of said one of said first and second potentiometer wipers.

8. A control in accordance with claim 7 in further combination with a remote throttle controlling lever which is mechanically connected to said first wiper and which can be variably positioned to provide the first input, a carburetor having a throttle valve which is mechanically connected to said second wiper and which can be variably positioned to provide the second input, and wherein said means connected to said second input for selectively changing the position thereof is connected to said throttle valve and is operable to cause pivoting of said throttle valve so as to maintain said throttle valve in registry with said throttle controlling lever in response to positioning of said remote throttle controlling lever.

9. A steering control including a movable steering wheel for a swingable steerable unit, said control comprising a first position sensing potentiometer adapted to be electrically connected to a source of current and having a first wiper mechanically connected to the steering wheel to afford variation in the potential at said first wiper in accordance with steering wheel setting, a second position sensing potentiometer adapted to be electrically connected to the source of current connected to the first potentiometer and including a second wiper mechanically connected to the swingable steering unit to afford variation in the potential at said second wiper in accordance with the position of the swingable steering unit, means mechanically connected to the steering unit for selectively swinging the steering unit in opposite directions, first transistorized switch means adapted to be electrically connected to a source of current and to said first potentiometer wiper and to said steering unit swinging means for effecting swinging of the steering unit in one pivotal direction when the potential at said first potentiometer wiper is greater than the potential at said second potentiometer wiper, a second transistorized switch means adapted to be electrically connected to the source of current connected to said first transistorized switch means and to said second potentiometer wiper and to said steering unit swinging means for effecting swinging of the steering unit in the opposite pivotal direction when the potential at said second potentiometer wiper is greater than the potential at said first potentiometer wiper, and a third potentiometer electrically connected to each of said first and second switch means and having a wiper mechanically connected to one of said first and second potentiometer wipers to effect setting of said third potentiometer wiper in accordance with the setting of said one of said first and second potentiometer wipers.

* * * * *

PO-1050
(5/69)

UNITED STATES PATENT OFFICE
CERTIFICATE OF CORRECTION

Patent No. 3,662,243          Dated May 9, 1972

Inventor(s) David T. Cavil, William R. Krueger, Henry J. Schmidt

It is certified that error appears in the above-identified patent and that said Letters Patent are hereby corrected as shown below:

Column 7, line 43     "in" should be --- to ---.

Signed and sealed this 5th day of September 1972.

(SEAL)
Attest:

EDWARD M. FLETCHER, JR.            ROBERT GOTTSCHALK
Attesting Officer                  Commissioner of Patents